(12) United States Patent
Kilroy (10) Patent No.: US 6,984,311 B2
(45) Date of Patent: Jan. 10, 2006

(54) FLUID-SOLID CONTACTING METHOD

(75) Inventor: James W. Kilroy, Santa Fe, TX (US)

(73) Assignee: UOP LLC, Des Plaines, IL (US)

( * ) Notice: Subject to any disclaimer, the term of this patent is extended or adjusted under 35 U.S.C. 154(b) by 670 days.

(21) Appl. No.: 10/198,197

(22) Filed: Jul. 17, 2002

(65) Prior Publication Data

US 2002/0179496 A1 Dec. 5, 2002

Related U.S. Application Data

(62) Division of application No. 09/505,325, filed on Feb. 16, 2000, now Pat. No. 6,455,015.

(51) Int. Cl.
*C10G 59/00* (2006.01)
(52) U.S. Cl. ............... 208/146; 208/151; 208/155; 208/156; 208/157; 208/49
(58) Field of Classification Search ............... 208/49, 208/146, 151, 155, 156, 157
See application file for complete search history.

(56) References Cited

U.S. PATENT DOCUMENTS

| | | | |
|---|---|---|---|
| 3,652,450 A | 3/1972 | Boyd | 208/146 |
| 3,652,451 A | 3/1972 | Boyd | 208/146 |
| 4,456,181 A | 6/1984 | Burnham | 239/403 |
| 5,081,086 A | 1/1992 | Wilcher et al. | 502/81 |
| 5,240,183 A | 8/1993 | Bedaw et al. | 239/403 |
| 5,553,783 A | 9/1996 | Slavas et al. | 239/403 |
| 5,847,252 A | 12/1998 | Stine et al. | 585/330 |
| 5,948,241 A | 9/1999 | Owen | 208/113 |

OTHER PUBLICATIONS

*Handbook of Petroleum Refining Processes* Edited by: Robert A. Meyers (New York, McGraw-Hill, 2$^{nd}$ Edition 1986) pp. 1.33-1.36, 1-43 to 1-53 ISBN 0-07-041763-6 TP 690.H34.
*Perry's Chemical Engineers' Handbook,* Edited by: Robert H. Perry et al. (New York, McGraw-Hill, 7$^{th}$ Edition 1997) pp. 6-32 to 6-34 ISBN 0-07-049841-5 TP151.P45.

Primary Examiner—Tam M. Nguyen
(74) *Attorney, Agent, or Firm*—John G. Tolomei; James C. Paschall; Michael A. Moore (57) ABSTRACT

An apparatus and method for contacting fluids in a fluid-solids contacting chamber is disclosed. The fluid-solid contacting chamber has a plurality of beds, and the chamber comprises a plurality of conduits and outlet ports that are capable of providing improved fluid distribution of fluids that are introduced above or between the beds. One or more conduits are arranged within a single conduit, which provides a compact and inexpensive assembly for conveying the fluids to each conduit's outlet port. In operation, the fluid flow to the outlet port of each conduit is regulated within that outlet port's most efficient operating range, and since the flows can regulated simply by hand, the method of this invention can be practiced readily. Catalytic condensation and other hydrocarbon process units that employ this invention will have increased on-stream efficiencies and realize significant economic benefits.

14 Claims, 6 Drawing Sheets

FLUID-SOLID CONTACTING METHOD

CROSS-REFERENCE TO RELATED APPLICATION

This application is a Division of U.S. application Ser. No. 09/505,325 filed Feb. 16, 2000, now U.S. Pat. No. 6,455,015 the entire contents of which are hereby incorporated by reference.

FIELD OF THE INVENTION

This invention relates to an apparatus for contacting fluids in a fluid-solids contacting zone such as an adsorption zone or a reaction zone. More particularly, the invention is directed to the contacting of two fluids comprising a liquid phase and a vapor phase in a fluid-solids contacting zone, and to means and methods for effecting improved heat exchange between the vapor and liquid phases in the contacting vessel. More specifically, the invention relates to a new and improved method and apparatus for uniformly distributing a liquid phase into a flowing liquid, vapor, or mixed liquid-vapor phase in a granular or particulate solids contacting zone, as in an adsorption tower or in a catalytic reactor such as a catalytic condensation reactor.

BACKGROUND OF THE INVENTION

Many of the most important commercial hydrocarbon conversion processes involve the physical or chemical treatment of hydrocarbons and other organic materials with beds of granular or particulate solid contact materials. Many of these processes involve contacting two fluids with the contact materials. Often one of the fluids comprises a liquid phase while the other fluid comprises a gas or vapor phase, a liquid phase, or a mixed vapor-liquid phase. It is well known that introducing a liquid phase into either a gas or vapor phase or a mixed vapor-liquid phase, and in a manner that achieves uniform distribution, is difficult to attain.

A typical process wherein uniform distribution of liquid and gas phases, or of liquid and mixed gas-liquid phases, is necessary but infrequently achieved, is that of catalytic condensation. The chemical processing industry uses the catalytic condensation process to produce transportation fuels, olefinic petrochemicals such as octene and nonene, and alkyl aromatic hydrocarbons such as cumene, that are sold in bulk as commercial commodities. When producing transportation fuels or olefinic petrochemicals, the catalytic condensation process oligomerizes olefins in the presence of a particulate solid catalyst, and the process is known within the industry as catalytic polymerization or as simply "cat poly," with the resulting motor fuel, which may comprise dimers, trimers, and tetramers, often referred to as polymer gasoline. The feed to such a catalytic condensation reaction zone typically comprises propylene and butylene, although propane and butane may also be present. Prevailing conditions in the reaction zone are generally vapor phase at relatively low reaction pressures, or a dense fluid phase or a mixed vapor-liquid phase at a higher pressures. When producing alkyl aromatics, the catalytic condensation process alkylates aromatic hydrocarbons with olefins in the presence of a particulate solid catalyst, and generally the reactants and products within the reaction zone are vapor-phase.

It is also well known that both the oligomerization and alkylation reactions that occur in the presence of the solid catalyst are exothermic, and that the temperature of the phase or phases in contact with the catalyst increases due to the exothermic heat of reaction. Excessive temperatures within the catalyst bed, however, can adversely affect the select physical and chemical properties of the catalyst and can lead to the formation of reaction byproducts. In order to avoid these undesirable consequences, it is typical to arrange the catalyst in a plurality of separate fixed beds so that diluent or quench liquids may be distributed between the beds during the reaction. In the case of olefin oligomerization, the cool quench liquids may comprise one or more of the olefin reactants and/or one or more paraffins having the same number of carbon atoms as the olefin reactants. In the case of aromatic alkylation, the cool quench may comprise one or more of each of the olefin reactants, paraffins, or aromatic reactants. The cool quench liquids reduce the temperature of the effluent from one bed of catalyst prior to feeding the mixture of effluent and quench liquid to the next bed of catalyst.

It is typical in the art of catalytic condensation to support each individual bed of catalyst upon a perforated support plate or grid deck. It is also typical in the art to introduce the quench liquid between the fixed beds of catalyst by means of a single nozzle attached to a single pipe. The quench liquid is introduced through an inlet port or opening in the reactor vessel wall into one end of the pipe, which is mounted to the inlet port via a flanged connection on the outside wall of the reactor vessel. The pipe extends into the reactor vessel, so that the nozzle attached to the end of the pipe is at the quench point, a position in the cross-section of the vessel where discharge of the quench liquid is desired. Typically, the quench point is at the center-point of the cross-section. It is typical first to assemble the pipe and nozzle assembly outside of the reactor vessel, and then to insert, or stab in, the assembly through the inlet port. The dimensions of the opening of the inlet port are typically only slightly greater than that needed to allow the pipe with its attached nozzle to pass through. This arrangement allows the pipe and nozzle assembly to be inserted into or withdrawn from the reactor vessel even when the grid decks are in place and the beds are fully loaded with catalyst. Using this arrangement, assembly or disassembly of the pipe or nozzle within the reactor vessel does not require reactor maintenance workers to enter between the beds. This is an important consideration in catalytic condensation processes, especially during loading and unloading of the catalyst beds, when such assembly or disassembly would be difficult and time-consuming. In fact, this consideration precludes the use in catalytic condensation reactor vessels of large distributor grids consisting of multiple perforated pipe branches that are positioned throughout the entire cross-section, since such complex distributors would require unacceptable difficulties and delays for assembly and disassembly.

A fluid distributing apparatus in a catalytic condensation reactor is used with the intent of achieving a complete distribution of the quench liquid as uniformly as possible throughout the cross-sectional area of the reactor vessel and of the catalyst bed below. It is also the purpose of the apparatus that the effluent from the catalyst bed above flows down from the perforated support plate throughout the cross-sectional area of the reactor while the quench liquids is distributed by the single nozzle and plate assembly throughout the cross-sectional area of the reactor vessel. Further, it is the purpose of fluid distributing apparatus to provide an intimate contact between the cooled quench and the hot effluent from the bed above the fluid distributing apparatus in order to achieve a uniform temperature of the components that are fed to the bed below the fluid distributing apparatus.

However, the prior art fluid distributing apparatus comprising a single nozzle attached to a single pipe has proven to be relatively ineffective in accomplishing these objectives. Achieving these objectives is made difficult by the fact that it is typical to add a relatively small amount of cool quench liquids to a relatively large quantity of hot effluent which is leaving the bed above at an elevated temperature. The difficulty is further complicated by the fact that the amount of cool quench is relatively small in relation to the large cross-sectional area of the reactor vessel which must be covered in order to maintain a proper uniform distribution of the phase or phases present to the bed of catalyst below. In addition, the amount and composition of quench material injected after any particular bed may be varied according to need, which depends in large part on the amount of heat of reaction to be dissipated. For example, a recently-loaded catalyst bed containing highly active fresh catalyst may generate a relatively large heat of reaction, but the same catalyst bed after several months of operation may contain partially deactivated catalyst and may generate relatively little heat of reaction. In order to maintain the desired inlet temperature of the catalyst bed below a catalyst bed that is generating less heat of reaction, the flow of quench material between the two catalyst beds must be decreased. However, experience with commercial nozzles has shown that it is typical that even only a 30% decrease in the flow rate of quench fluid from a nozzle's design rate causes a significant deterioration in the nozzle's capability to distribute fluid across the cross-section of the reactor. The result is that the temperature encountered within the catalyst bed below will be quite uneven, and localized undesirable hot spots are often found in the bed below. It is well-known by those skilled in the art that the existence of hot spots within the catalyst bed leads to indiscriminate and nonselective reactions of the reactants, which is an undesirable result.

Accordingly, an improved apparatus and an improved method for contacting fluids in a fluid-solids contacting chamber are sought that can provide uniform distribution of fluid flow, even at relatively low flow rates, so as to prevent the problems associated with high temperatures in catalyst beds.

SUMMARY OF THE INVENTION

This invention is an improved apparatus and method for contacting fluids that can be readily and inexpensively employed to provide uniform distribution of fluid flow in or between particulate solid beds of a fluid-solids contacting chamber, even at relatively low flow rates. This invention solves the problems associated with maldistribution of fluid in such solid beds that arise from the inefficiency of nozzles when operated at flow rates that are significantly lower than their design flow rates. Compared to the apparatus of the prior art, the apparatus of this invention incorporates one or more additional conduits and outlet ports that are capable of providing improved fluid distribution. The additional conduit(s) are arranged within a single conduit, to which the additional outlet port(s) are also attached, in a manner which allows the assembly of the plurality of conduits and outlet ports to be extended into the fluid-solids contacting chamber through an opening or port in the chamber wall that is, in some embodiments of this invention, either the same size or insignificantly larger than that through which the single conduit, with its single outlet port, is extended. Thus, the apparatus of this invention can be inserted into or withdrawn from the space between beds of the fluids-solid contacting chamber, even when access between the beds is restricted, such as when the beds are fully loaded with solids. The method of this invention can be practiced using inexpensive manual valves to increase or decrease the flow of fluid to the plurality of nozzles. In addition to these advantages of low apparatus cost and ease of operation, this invention also can increase significantly the time period between shutdowns of the fluid-solids contacting chamber, thereby greatly improving the efficiency and profitability of operating fluid-solids contacting chambers, particularly catalytic condensation reactors.

Accordingly, in an apparatus embodiment, this invention is a fluid-solid contacting chamber. Within the chamber, which has a chamber wall, is positioned a first bed that holds and retains particulate solids. A second bed which holds and retains particulate solids is also positioned within the chamber. Together, the chamber wall, the first bed, and the second bed define at least in part an interbed space that is within the chamber. The chamber also comprises an outer conduit connected to the chamber wall. A first inlet port is connected to the outer conduit for introducing fluid into the outer conduit. A first outlet port is connected to the outer conduit and in fluid communication with the interbed space for discharging fluid from the outer conduit and into the interbed space. An inner conduit is positioned within the outer conduit. The inner conduit has an inner conduit wall, and the inner conduit wall and the outer conduit define at least in part an outer space. The outer space is in fluid communication with the first inlet port and the first outlet port. The inner conduit wall defines at least in part an inner space within the inner conduit. A second inlet port is connected to the inner conduit for introducing fluid into the inner conduit, and the second inlet port is in fluid communication with the inner space. A second outlet port is connected to the inner conduit and in fluid communication with the inner space and the interbed space for discharging fluid from the inner space and into the interbed space.

In one of its method embodiments, this invention is a method of mixing fluids in a fluid-solid contacting chamber. An effluent is withdrawn from a first bed containing particulate solids in a fluid-solid contacting chamber. The effluent passes into an interbed space within the chamber, and the interbed space is defined in part by the first bed and the wall of the contacting chamber. A first quench fluid passes into an inlet end of a first quench conduit, and the first quench fluid is discharged from an outlet end of the first quench conduit into the interbed space at a first flow rate. After passing the first quench fluid at the first flow rate, the flow rate of the first quench fluid is decreased to a second flow rate that is less than the first flow rate. Also, after passing the first quench fluid at the first flow rate, a second quench fluid passes into an inlet end of a second quench conduit, and the second quench fluid is discharged from an outlet end of the second quench conduit at a third flow rate that is less than the first flow rate. The second quench fluid passes through an interconduit space, which is defined by the wall of the first quench conduit and the wall of the second quench conduit. After passing the second quench fluid at the third flow rate, the flow rate of the second quench fluid is decreased to a fourth flow rate that is less than the third flow rate. The effluent is contacted with at least one of the first quench fluid and the second quench fluid in the interbed space to produce a mixture, which passes to a second bed containing particulate solids in the fluid-solid contacting chamber.

Other objectives and embodiments of the present invention are set forth in the detailed description of the invention.

INFORMATION DISCLOSURE

The use of a catalytic condensation process for producing cumene is described at pages 1–33 to 1–36 in the book entitled *Handbook of Petroleum Refining Processes*, edited by Robert A. Meyers, published by McGraw-Hill Book Company, New York, 1986. The use of catalytic condensation process for producing transportation fuels is described that pages 1–43 to 1–53 of the Meyers book.

General background information on fluid distribution, including perforated pipe distributors, is found at pages 6–32 to 6–34 of *Perry's Chemical Encineers' Handbook*, Seventh Edition, edited by Robert H. Perry et al., McGraw-Hill Book Company, New York, 1997.

The use of a quench header and multiple quench nozzles for introducing quench hydrogen between fixed beds of a hydrogenation, hydrotreating, hydrocracking, or hydrodealkylation reaction zone is described in U.S. Pat. Nos. 3,652,450 and 3,652,451. These patents also describe the use of a perforated pipe grid or distributor.

U.S. Pat. Nos. 4,456,181, 5,240,183, and 5,553,783 describe spray nozzles that mix a liquid and a gas.

U.S. Pat. No. 5,081,086 describes olefin oligomerization processes and aromatic alkylation process in which it may be desirable to quench the reactants to dissipate the heat of reaction. Benefits resulting from multiple quench injection are described.

U.S. Pat. No. 5,847,252 describes an olefin oligomerization process wherein higher molecular weight quench material is used within the oligomerization reaction zones, and higher molecular weight paraffins such as $C_8$ and heavier hydrocarbons are recycled.

DETAILED DESCRIPTION OF THE INVENTION

As noted herein above, one application wherein the present invention is useful is in the art of catalytic condensation, that is, oligomerizing olefinic hydrocarbon constituents in a catalytic reaction zone.

Figure 1:
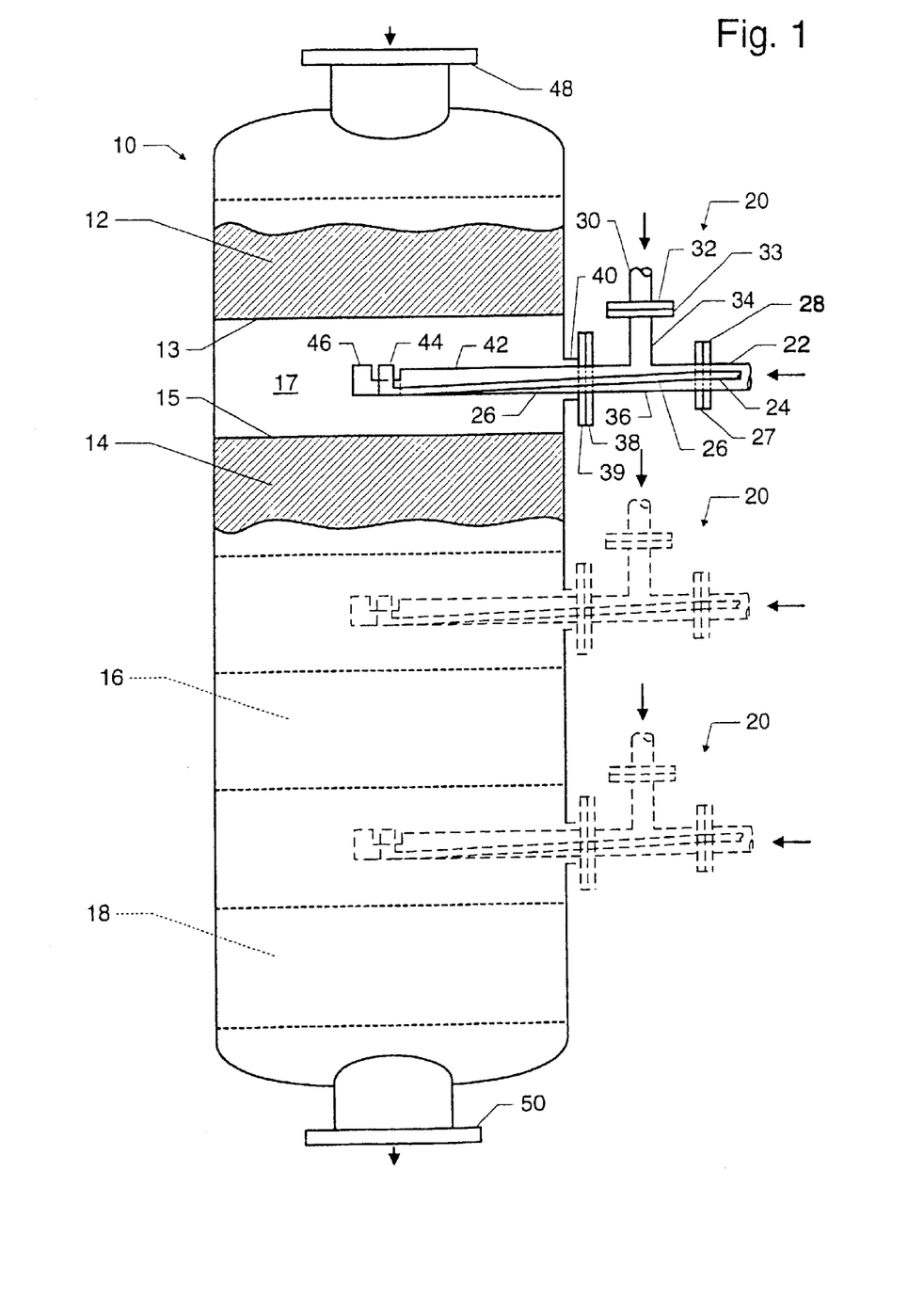
FIG. 1 shows a partially cut-away elevation view of a typical catalytic condensation reactor vessel showing an embodiment of the invention.

FIG. 1 indicates a partially cut-away elevation view of a typical catalytic condensation reactor vessel wherein there is contained four stationary or fixed beds of catalytic condensation catalyst, beds 12, 14, 16, and 18. The reactor vessel comprises a vertically elongated contacting chamber 10, with a fluid inlet port 48 located on the top of the vessel and a fluid outlet port 50 located on the bottom of the vessel. Additionally, the reactor vessel contains ports 40 below each of the first three catalyst beds, beds 12, 14, and 16.

Each catalyst bed comprises a bed of randomly packed granular or particulate catalyst solids. The catalytic condensation catalyst comprising each bed of particles can be of any type of catalyst known in the art, and will typically comprised of catalyst in pilled, spherical, or extruded form. Each catalyst bed may be supported upon a layer (not shown) of nonreactive or inert particulate support material, which may be any of the well known prior art inner support materials such that is ceramic balls, Raschig rings, or Berl saddles. The top of each bed of catalyst may contain an additional layer (not shown) of the same type of inert support material. As is well known to those skilled in the art, it is normal to provide such an upper layer of inert materials on top of the bed in order to afford improved distribution for the reactants flowing down from the bed above before these reactants reach the active catalyst particles. In addition, the inert support material on the top of each bed provides a layer of high density material sufficient to keep the bed of lower density catalyst particles securely in place under conditions of pressure surge which would otherwise dislocate the catalyst particles. Each bed of catalyst comprising catalyst particles and any inert support material is retained and supported upon a perforated support plate or grid deck 13. Each grid deck 13 is located a distance above and away from the top 15 of the catalyst bed below. This provides a confined open space 17 between each catalyst bed above and each catalyst bed below.

Figure 3:
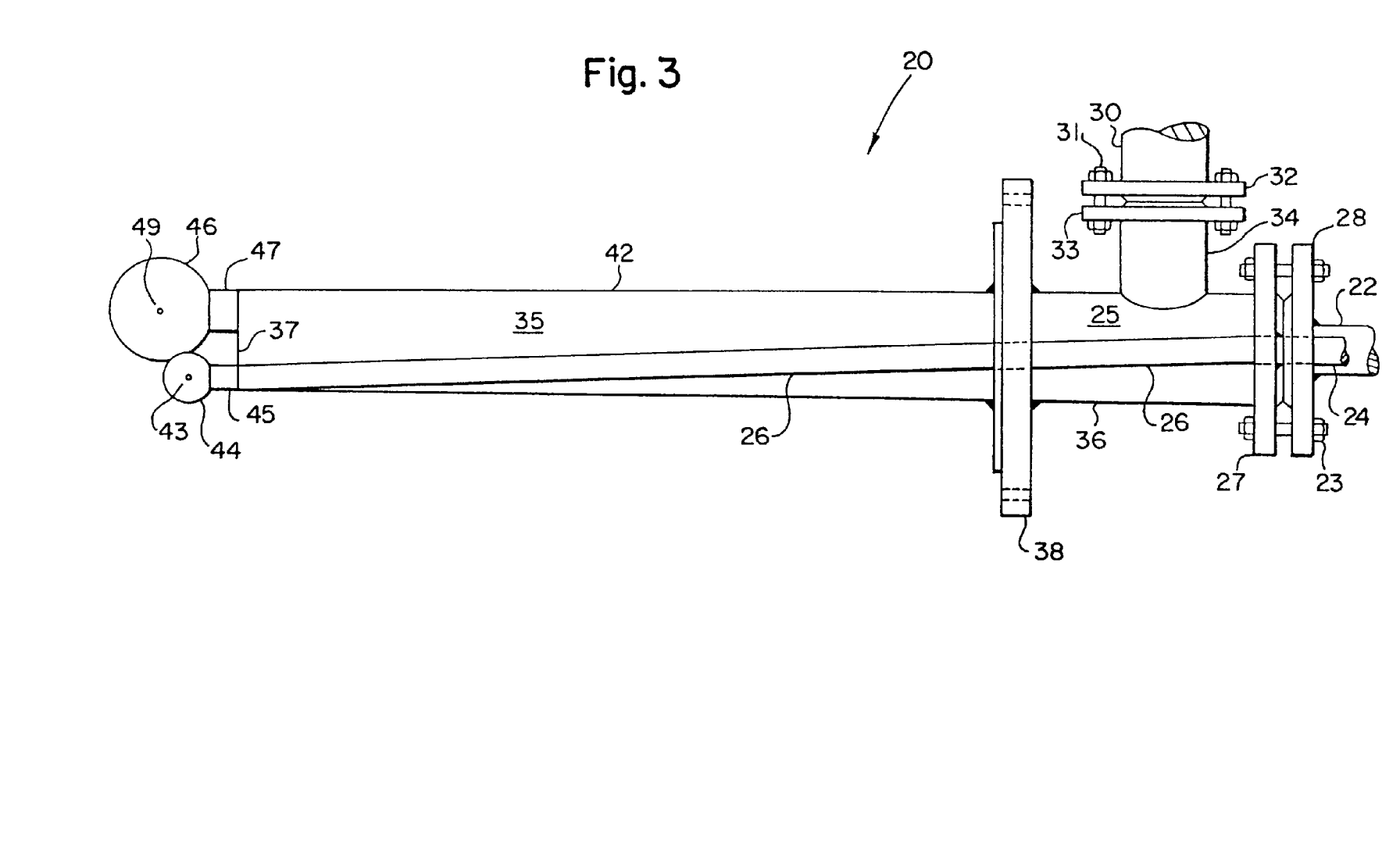
FIGS. 3 and 4 show details of embodiments of the invention.

Into this open space 17 there is projected from vessel port 40 and flange 39 outer quench pipe 42, which is part of pipe and nozzle assembly 20. Referring now also to FIG. 3, quench material such as propylene, butylenes, propane, and butanes is supplied to assembly 20 through two quench material supply lines 22 and 30. Quench material supply line 30 is capable of supplying quench material to line 34, since flange 32 is welded to line 30 and is connected by bolts 31 to flange 33, which is welded to line 34. Line 34 in turn is attached to outer quench pipe extension 36 and can supply quench fluid into annular space 25. Annular space 25 is defined in part by outer quench pipe extension 36 and inner quench pipe 26. One end of extension 36 is welded to flange 27, which defines the limit of that end of annular space 25. The other end of extension 36 is welded to one side of flange 38, which is in turn connected by bolts (not shown) to flange 39 of vessel port 40 of chamber 10. In this manner, assembly 20 is mounted to chamber 10. Outer quench pipe 42, which can be any type of pipe or other conduit device, is welded to the other side of flange 38, and quench material can pass from annular space 25 through flange 38 to annular space 35, which is defined in part by outer quench pipe 42 and inner quench pipe 26.

Plate 37 is attached to the end of outer quench pipe 42. Referring now also to FIGS. 5–8, plate 37 defines an opening 41, which permits quench fluid to flow from annular space 35 and into fitting 47. Fitting 47 can be any type of suitable pipe or conduit fitting, such as a pipe elbow. Fitting 47 is attached to nozzle 46 and permits quench material to flow from opening 41 to nozzle 46. With the longitudinal axis of outer quench pipe 42 in a substantially horizontal orientation and the longitudinal axis of nozzle 46 in a substantially vertical orientation, fitting 47 thus redirects the quench material flow from a substantially horizontal flow direction through an angle of 90 degrees to a substantially vertical and upward flow direction. The tip or top of nozzle 46 defines at least one aperture 49 for discharging the quench material from nozzle in a generally vertical and upward direction. Thus, aperture 49 is preferably arranged so as to oppose the bottom face of the bed, which is supported by plate 13. Nozzle 46 may have more than one aperture 49. The number, size, arrangement, and orientation of apertures may be arrived at without undue experimentation by a person of ordinary skill in the art of nozzle design, by considering such factors as the cross-sectional area of the reactor vessel which must be covered in order to maintain a proper uniform distribution of phases to the bed of catalyst 14, 16, or 18 below. Other factors in nozzle selection include the design flow rate of cool quench liquid through the nozzle 46, as well as the fluid properties of the quench liquid. Suitable nozzles includes conical spray nozzles, which are well known and are available from Bete Fog Nozzle, Inc., 50 Greenfield Street, Greenfield, Mass., USA. See, for example, U.S. Pat. No. 4,014,470. Nozzle 46 has a relatively high design flow rate.

Referring again to FIG. 3, quench material, such as propylene, butylenes, propane, and butanes, is also supplied to assembly 20 through quench material supply line 22. Quench material supply line 22 is welded to flange 28, which is connected by bolts 23 to flange 27. Instead of a pair of flanges and bolts, a union may be used to make this connection. Supply line 22 is capable of supplying quench material into inner quench pipe extension 24, since one end of inner quench pipe extension 24 extends into line 22. Pipe extension 24, in turn, is capable of supplying quench material into inner quench pipe 26, since the other end of pipe extension 24 is welded to an end of inner quench pipe 26. The outer circumference of the end of inner quench pipe 26 that is welded to pipe extension 24 is welded to the inner circumference of flange 27, so that the annular space between inner quench pipe 26 and flange 27 is blocked and thus there is a barrier to the flow of quench material from or into annular space 25 through flange 27. Accordingly, flow of quench material through flange 27 from supply line 22 into annular space 25 is also blocked, while the flow of quench material through flange 27, as well as through flange 28, is capable inside pipe extension 24 and inner quench pipe 26.

Inner quench pipe 26, which can be any type of pipe or other conduit device, is capable of supplying quench material to fitting 45 and nozzle 44. Preferably, inner quench pipe 26 is imperforate. Inner quench pipe 26 extends into and through outer plate extension 36, flange 38, and outer quench pipe 42 to end plate 37. Referring again to FIGS. 5–8, plate 37 defines an opening 39, which permits quench fluid to flow from inside inner quench pipe 26 and into fitting 45. Fitting 45 and be any type of suitable pipe or conduit fitting, such as a 90-degree pipe elbow. Fitting 45 is attached in turn to nozzle 44 and permits quench material to flow from opening 39 to nozzle 44. Elbow 45 redirects the quench material flow to a substantially vertical and upward flow direction, and nozzle 44 discharges the quench material through aperture 43. Thus, aperture 43 is preferably oriented so as to oppose the bottom face of the bed, which is supported by plate 13. The number, size, arrangement, and orientation of one or more apertures 43 defined by the top of nozzle 44 may be arrived at without undue experimentation, as previously described for one or more apertures 49 of nozzle 46. In this case, however, one or more apertures 43 are selected with a view toward the design flow rate of quench material through nozzle 44. Nozzle 44 has a relatively low design flow rate compared to nozzle 46. A conical spray nozzle, described previously, is suitable for nozzle 44.

Figure 4:
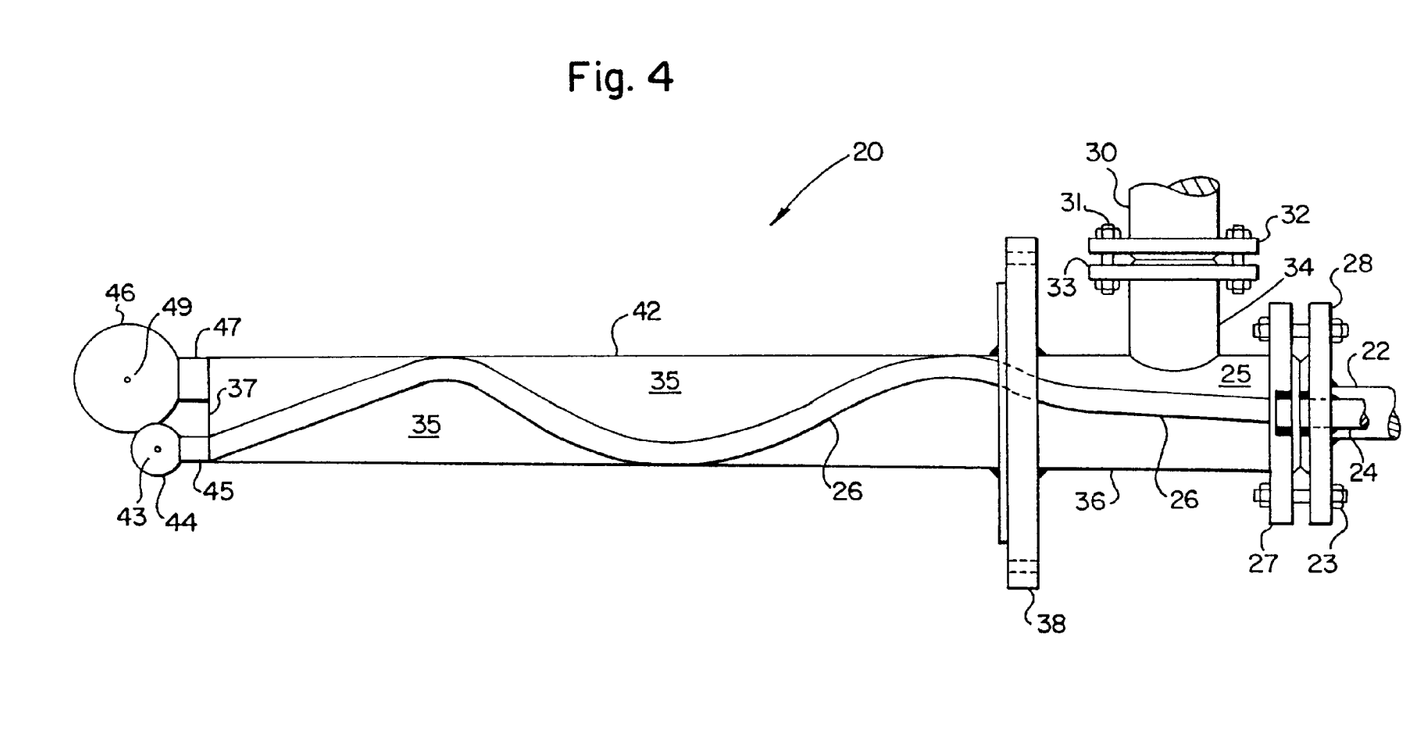
Figure 5:
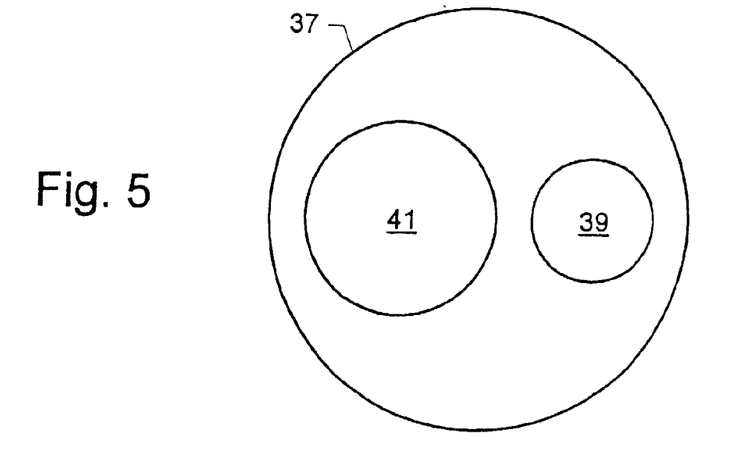
FIGS. 5 and 6 show further details of embodiments of the invention.
Figure 6:
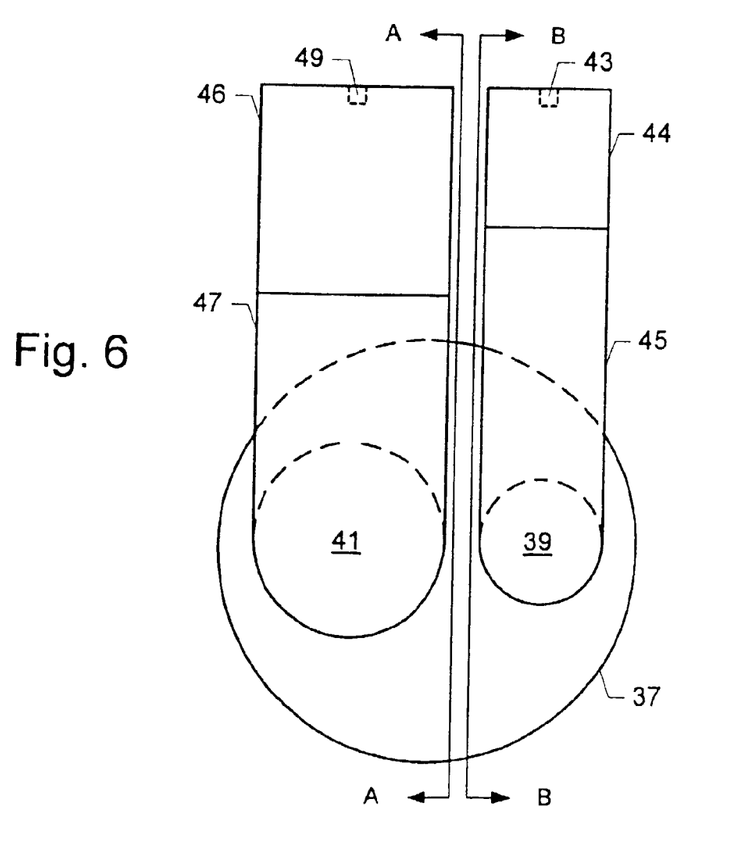
Figure 7:
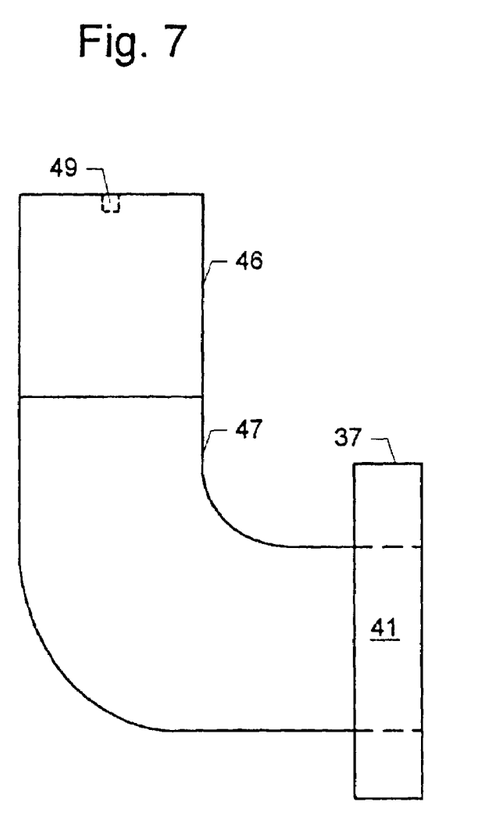
FIG. 7 shows Section A—A of FIG. 6.
Figure 8:
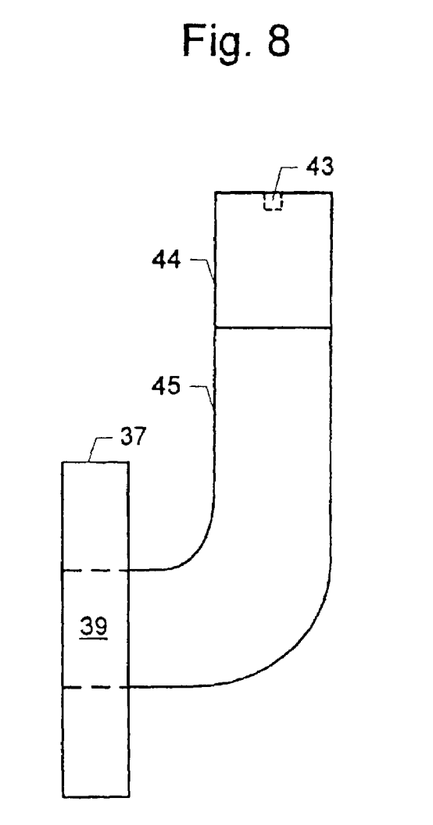
FIG. 8 shows Section B—B of FIG. 6.

FIG. 4 shows another embodiment of assembly 20, that employs tubing rather than piping for directing quench material from quench material supply line 22 to plate 37 and opening 39. Accordingly, the component parts shown in FIG. 4 are similar in function and purpose to those shown in FIG. 3, therefore FIG. 4 is not described in detail herein, in order to avoid repetition. The item numbers used in FIG. 4 are consistent with those used in FIG. 3. Referring now to FIG. 4, inner quench tubing 26 extends from flange 27, through pipe extension 36 and pipe 42, and to plate 37. Since tubing is less rigid than pipe and will thus likely be more flexible, FIG. 4 depicts inner quench tubing 26 as winding its way somewhat circuitously through pipe extension 36 and pipe 42. Flange 27, fitting 45, as well as possibly extension 24, may be different from those used in FIG. 3 in order to accommodate the requirements of connections to tubing rather than pipe.

Figure 2:
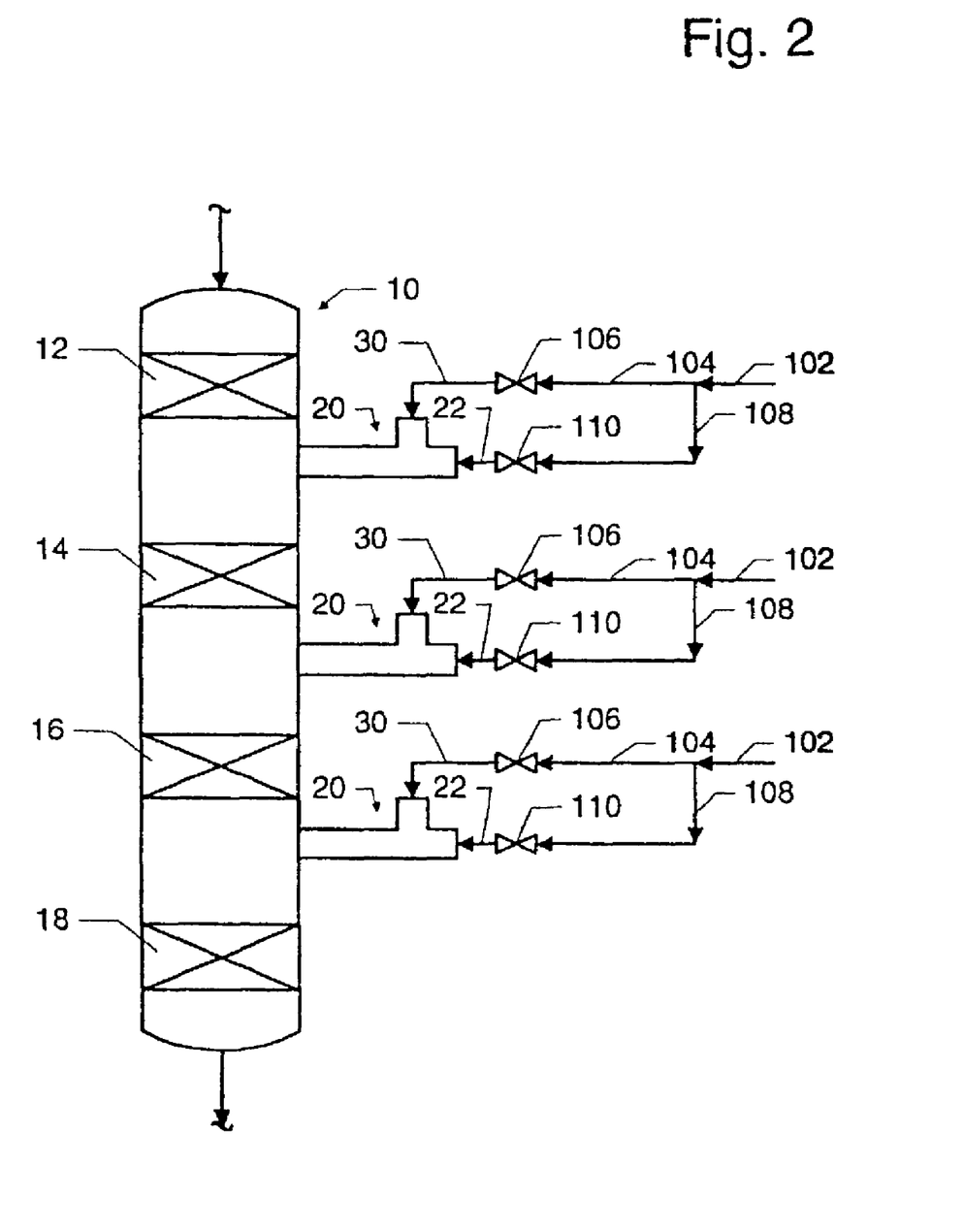
FIG. 2 shows a flow diagram containing an embodiment of the invention.

FIG. 2 shows a process flow diagram in which an embodiment of the invention is used. For clarity and simplicity, some items associated with the use of the embodiment have not been shown. These include flow and pressure and temperature monitoring and control systems, vessel internals, etc., which may be of customary design. FIG. 2 is not intended to limit the scope of the present invention as set forth in the claims. Referring now to FIG. 2, a two-branched piping manifold is provided for supplying quench material below each of the first three catalyst beds, beds 12, 14, and 16. A source of quench material, such as propylene, butylenes, propane, and butanes, flows through line 102 and divides into two portions. A first portion flows through line 104, is regulated by manual valve 106, flows into quench material supply line 30, enters assembly 20, and is ultimately discharged through nozzle 46 (not shown in FIG. 2.) A second portion flows through line 108, is regulated by manual valve 110, flows into quench material supply line 22, enters assembly 20, and is ultimately discharged through nozzle 44 (not shown in FIG. 2).

Using the process flow diagram of FIG. 2, a wide range of quench flow rates to any bed is possible while nevertheless remaining within the range of operation for each nozzle that results in optimum distribution of fluid from that nozzle across the cross-section of the reactor. For a commercially available nozzle, the flow rate through the nozzle should be maintained generally within the range of 70% to 100% of the design flow rate through the nozzle, in order to avoid significant deterioration in the nozzle's capability to distribute fluid across the cross-section. Whether the lower end of this efficient operating range is, for a given nozzle, 70%, or as low as 60%, or as high as 80%, will vary from nozzle to nozzle, even within a single nozzle manufacturer's nozzle product line. Whatever the actual numerical value, this lower end of the range represents the point where the decrease in flow rate through the nozzle results in such an inefficient spray pattern from the nozzle that the quenching performance of the nozzle is unacceptable, as determined by excessive temperatures or hot spots in the catalyst bed below the quench point. Similarly, at the upper end of this efficient operating range, a given nozzle's performance will become increasingly inefficient as the flow rate through the nozzle increases to or exceeds the design flow rate. For a given nozzle, the upper end of this efficient operating range may be as low as, say, 95%, or as high as perhaps 120%. In any event, operating the nozzle above this upper end of the range exceeds the point where the increased flow rate causes an inefficient spray pattern through the nozzle, quenching suffers, and localized hot spots appear in the catalyst bed below the quench point.

The advantages of the apparatus and method of this invention is illustrated in the following three examples. Although these illustrations are prophetic, they are based on experience with operating similar catalytic condensation process units. These examples make reference to FIGS. 1–8. These examples are not intended to limit the scope of the invention as set forth in the claims.

EXAMPLE 1

Referring to FIGS. 1–8, nozzle 46 has a design flow rate of 100 flow units, nozzle 44 has a design flow rate of 70 flow units, and the initial need for quench material flow rate between beds 12 and 14 is 100 flow units. Thus, valve 106 is open completely and valve 110 is completely closed. Over time, the need for quench flow decreases, because the catalyst in bed 12 deactivates due to nitrogen poisoning. The symptom of deactivation in bed 12 is the temperature in bed 14, which decreases over time while the flow rate of quench material through nozzle 46 is constant. When bed 14 temperatures falls to an unacceptable extent, valve 106 is closed slightly. This decreases the flow or quench material and thereby allows the temperatures in bed 14 to increase to the desired temperature for bed 14.

Over time, valve 106 continues to be closed to a greater and greater extent in response to more severe deactivation of the catalyst in bed 12. After a period of time, valve 106 is closed to the point where the flow rate through nozzle 46 is 70 flow units, or 70% of its design flow rate. For purposes of this illustration, it is assumed that 70% of the design flow rate of nozzle 46 is the point at which the quenching performance of nozzle 46 becomes so inefficient as to be unacceptable. Even though over time the temperatures in bed 14 are decreasing, thereby decreasing the need for quench flow through nozzle 46, high localized temperatures in bed 14 indicate that the performance of nozzle 46 has become inefficient. That is, despite the general decline over time of temperatures in bed 14, nevertheless the diminished performance of nozzle 46 at low quench flow rates means that nozzle 46 is unable to prevent excessively high temperatures from arising in localized spots within the bed 14.

At this point in time, in the absence of the present inventive apparatus and method, the excessively high temperatures would tend to cause unacceptable amounts of polymerized by-products to form, the presence of these by-products in beds 14, 16, and 18 would cause the pressure drops across these beds to increase excessively, and for that reason processing in chamber 10 would need to be stopped prematurely and chamber 10 would need to be taken out of service and decommissioned, so that the deactivated catalyst in bed 12 could be replaced. Although in theory only bed 12 would have to be unloaded and replaced, the practice in industry is to unload not only bed 12 but also beds 14, 16, and 18 as well, even if, as is nearly always the case, the catalyst in those other beds is not excessively deactivated. Thus, without the present invention, chamber 10 and the catalyst within it are used inefficiently, since chamber 10 is taken out of service and all of its catalyst is discarded, despite its having useful life remaining.

In accord with the apparatus and method of the present invention, however, chamber 10 remains in service. Valve 106 is completely closed, and valve 110 is completely opened, and this changeover is preferably performed simultaneously and in synchronization. Preferably, as the flow through nozzle 46 is being decreased, the flow through nozzle 44 is being increased. Although preferably this change does not substantially alter the flow rate of quench material through assembly 20, or preferably the flow rate after the changeover is not more than the flow rate prior to the changeover, the quench material flow is redirected from nozzle 46 to nozzle 44, which at 70 flow units, now operates at 100% of its design flow rate. Therefore, there is an improvement in the flow distribution of the quench material between beds 12 and 14, and this eliminates the excessively high localized temperatures within bed 14. Therefore, chamber 10 continues in operation, and the delays and costs associated with prematurely shutting down chamber 10 are avoided. While chamber 10 remains in operation, the catalyst in beds 14, 16, and 18 continue to be used to process hydrocarbons, which in effect extends the useful life of the catalyst in these beds relative to the prematurely shortened life that this catalyst would have had in the absence of this invention. Meanwhile, the catalyst in bed 12 continues to deactivate, and in response, valve 110 is closed slightly. Over time, valve 110 continues to be closed as catalyst deactivation in bed 12 worsens. After a period of time, valve 110 is closed to the point where the flow rate through nozzle 44 is 49 flow units, or 70% of its design flow rate. For purposes of this illustration, it is assumed that 70% of the design flow rate of nozzle 44 is the point at which the quenching performance of nozzle 44 becomes so inefficient as to be unacceptable. Therefore, at this point, chamber 10 is finally shut down. But, the apparatus and method of this invention lengthen the time between shutdowns of chamber 10 and utilize the catalyst in chamber 10 more efficiently, thereby increasing the efficiency and decreasing the costs associated with operating chamber 10.

EXAMPLE 2

Example 2 illustrates the apparatus and method of this invention providing quench material to chamber 10 over a similar period of time as that covered in Example 1. However, the focus of this Example 2 is on providing quench between beds 16 and 18, rather than between beds 12 and 14 as in Example 1. All references to valves, nozzles, and quench flows in this Example 2 are thus to those for the assembly 20 between beds 16 and 18, rather than to those associated with the assembly 20 between beds 12 and 14 in the case of Example 1.

Referring then to the assembly 20 between beds 16 and 18, nozzle 46 has a design flow rate of 100 flow units and nozzle 44 has a design flow rate of 70 flow units. For purposes of this illustration, it is assumed that, for each of nozzles 44 and 46, 70% of the design flow rate of the nozzle is the point at which the quenching performance of the nozzle becomes so inefficient as to be unacceptable. The initial need for quench material flow between beds 16 and 18 is 50 flow units, which is relatively low. Such a low need for quench material arises because the catalyst in bed 12 is highly active and most of the olefinic feedstock oligomerizes in bed 12. Thus, the amount of unreacted olefin that passes not only through bed 12 but also through bed 14 to enter bed 16 is relatively low, and the need to quench the effluent of bed 16 is minimal. At this time, valve 110 is partially closed, so as to allow only 50 flow units of quench material to flow through nozzle 44. Note that 50 flow units through valve 110 corresponds to slightly more than 70% of the design flow rate of nozzle 44. Valve 106 is completely closed. If, instead of valve 110, valve 106 were opened and operated at 70% of its design rate, the resulting flow of 70 flow units of quench material would unacceptably decrease the temperatures in bed 18, since a flow of only 50 flow units is needed.

Over time, the need for quench flow between beds 16 and 18 increases, because the catalyst in bed 12 deactivates due to nitrogen poisoning and more and more olefins pass unreacted through beds 12 and 14 and enter bed 16. The symptom of increasing utilization of the catalyst in bed 16 is the temperature in bed 18, which increases over time while the flow rate of quench material through nozzle 44 is constant. When bed 18 temperatures rises to an unacceptable extent, valve 110 is opened slightly more. This increases the flow or quench material and thereby allows the temperatures in bed 18 to decrease to the desired temperature for bed 18.

Over time, valve 110 continues to be opened to a greater and greater extent in response to more olefin oligomerization using the catalyst in bed 18. After a period of time, valve 110 is opened to the point where the flow rate through nozzle 44 is 70 flow units, or 100% of its design flow rate. For purposes of this illustration, it is assumed that 100% of the design flow rate of the nozzle 44 is the point at which the quenching performance of the nozzle becomes so inefficient as to be unacceptable. If the flow rate through nozzle 44 was further increased in response to the temperatures in bed 18, high localized temperatures in bed 18 would arise, since the performance of nozzle 44 has become inefficient. That is, at flow rates over 100% of its design flow rate, the diminished performance of nozzle 44 at such high quench flow rates means that nozzle 44 is unable to prevent excessively high temperatures from arising in localized spots within the bed 18.

At this point in time, in the absence of the present inventive apparatus and method, processing in chamber 10 would need to be stopped and chamber 10 would need to be taken out of service and decommissioned, so that the deactivated catalyst in bed 12 could be replaced. Although in theory only bed 12 would have to be unloaded and replaced, the practice in industry, as mentioned in Example 1, is to unload not only bed 12 but also beds 14, 16, and 18 as well. Thus, without the present invention, chamber 10 and especially the catalyst within bed 18 is used inefficiently, since chamber 10 is taken out of service and all of its catalyst is discarded, despite the catalyst in bed 18 having much of its useful life remaining.

In accord with the apparatus and method of the present invention, however, chamber 10 remains in service. Valve 110 is completely closed, and valve 106 is opened slightly, so that the flow through nozzle 46 is 70 units of flow. This changeover is preferably performed simultaneously and in synchronization. Preferably, while the flow through nozzle 44 is being decreased, the flow through nozzle 46 is being increased. Although preferably this change does not substantially alter the flow rate of quench material through assembly 20, or preferably the flow rate after the changeover is not less than the flow rate prior to the changeover, the quench material flow is redirected from nozzle 44 to nozzle 46, which at 70 flow units, now operates at 70% of its design flow rate. Therefore, there is an improvement in the flow distribution of the quench material between beds 16 and 18, and this eliminates the excessively high localized temperatures within bed 18. Therefore, chamber 10 continues in operation, and the delays and costs associated with prematurely shutting down chamber 10 are avoided. While chamber 10 remains in operation, the catalyst in beds 12, 14, 16, and especially 18 continue to be used to process hydrocarbons, which in effect extends the useful life of the catalyst in these beds relative to the prematurely shortened life that this catalyst would have had in the absence of this invention. Meanwhile, the catalyst in bed 12 and possibly bed 14 continues to deactivate, more olefin oligomerization occurs in bed 16, and in response, valve 106 is opened slightly. Over time, valve 106 continues to be opened as catalyst deactivation in bed 12 worsens and more olefins oligomerize in bed 16. After a period of time, valve 106 is open to the point where the flow rate through nozzle 46 is 100 flow units, or 100% of its design flow rate. For purposes of this illustration, it is assumed that 100% of the design flow rate of nozzle 46 is the point at which the quenching performance of nozzle 46 becomes so inefficient as to be acceptable.

Therefore, at this point, chamber 10 is finally shut down. But, the apparatus and method of this invention lengthen the time between shutdowns of chamber 10 and utilize the catalyst in chamber 10 more efficiently, thereby increasing the efficiency and decreasing the costs associated with operating chamber 10.

EXAMPLE 3

Example 3 illustrates another embodiment of this invention where the manual valves 106 and 110 shown in FIG. 2 are replaced with flow regulating or control valves. As used herein, a flow regulating valve is a valve in which the extent of opening of the valve is automatically controlled by a pneumatic or electrical signal from a control station, which is usually located in a centralized control facility, such as a control room or control building. Compared to a manual valve, the position of which is adjusted by hand turning or manipulation of a handle on the valve itself, the position of a regulating valve can be controlled more precisely and more frequently. With a regulating or control valve, accurate and frequent adjustments to the valve position are possible to an extent that would be excessively time-consuming or tedious for an operator to attempt by hand turning of a manual valve. Consequently, a flow regulating valve permits flow rates to be continually optimized in response to desirable flow control objectives that would be impractical or impossible with a manual valve. Suitable flow regulating valves are well known to persons of ordinary skill in the chemical processing industry.

Of course, in Examples 1 or 2, flow regulating or control valves could have been used instead of manual valves. It is believed, however, that, given the costs associated with such valves, most operators of catalytic condensation process units would generally use manual valves when operating in the manner described in Examples 1 or 2.

In this Example 3, replacing manual valves 106 and 110 shown in FIG. 2 with flow regulating or control valves allows the operator of a catalytic condensation process unit to operate over a significantly wider range of optimum quench flow rates, for a given nozzle and pipe assembly 20. Although there is a cost incurred with installing the flow regulating valves, that expense may be justified in some cases, since the flow regulating valves can significantly lengthen the time between shutdowns of the chamber 10. The resulting increase in on-stream utilization of chamber 10 can significantly improve the profits and economics of operating a catalytic condensation process.

In this Example 3, the design total flow rate of quench material to both nozzles (i.e., nozzles 44 and 46) is 100 flow units. Nozzle 44 has a design flow rate of 37 flow units, and nozzle 46 has a design flow rate of 63 flow units. Regulating valve 110 is capable of controlling the flow to nozzle 44 either at 0% (i.e., no flow) or between 70% and 100% of its design flow. Therefore, the actual flow rate through nozzle 44 is either 0 (i.e., no flow) or is between 25.9 and 37 flow units. Similarly, regulating valve 106 is capable of controlling the flow to nozzle 46 either at 0% or between 70% and 100% of its design flow. Thus, the actual flow rate through nozzle 46 is either 0 (i.e., no flow) or is from 44.1 to 63 flow units. Using flow regulating valves, it is possible to independently control each of the actual flow rates at these flow rates. Thus, quench material can flow solely through nozzle 44, solely through nozzle 46, or simultaneously through nozzles 44 and 46. When quench material is flowing through both nozzles, it is believed that the interference in the spray patterns of the two nozzles will cause minimal, if any, impairment in fluid distribution, and may improve distribution through the cross-section by virtue of the turbulence created by the colliding spray patterns.

In this embodiment, the entire range from 25.9 to 100 flow units of quench flow rates to any bed is attainable, with two small exceptions, in the following manner. First, with no flow through nozzle 46, the flow through nozzle 44 can be regulated between 25.9 and 37 flow units. Then, with no flow through nozzle 44, the flow through nozzle 46 can be regulated between 44.1 and 63 flow units. Next, with the flow through nozzle 46 at 44.1 flow units, the flow through nozzle 44 can be regulated between 25.9 and 37 flow units, corresponding to a total flow of 70 to 81.1 flow units. Finally, with the flow through nozzle 44 at 37 flow units, the flow through nozzle 46 can be regulated between 44.1 and 63 flow units, for a total flow of 81.1 to 100 flow units. Thus, the two small exceptions are from 37.1 to 44.0 flow units and from 63.1 to 69.9 flow units, which should not impair operating flexibility significantly, allowing for relatively minor adjustments in feed rate or quench temperature, if needed. Therefore, this Example 3 shows that the apparatus and method of the present invention allows the amount of quench material injected after any particular bed to be varied according to need over essentially the entire range from as low as nearly 25% of the design rate up 100% of the design rate.

By comparison, if the prior art arrangement comprising a single pipe and a single nozzle had been used, the amount of quench material injected would have been limited to the range of only from 70% to 100% of the design rate. Thus, Example 3 is clearly advantageous over the prior art arrangement. But, Example 3 also provides a striking advantage over Examples 1 and 2. In Examples 1 and 2, the lowest quench flow rate was about 49% of the design flow rate, but this Example 3 allows the quench flow rate to reduced to about 25% of the design flow rate. Thus, even in comparison to Examples 1 and 2, this Example 3 allows significantly even longer periods of time between shutdowns of chamber 10, greater utilization of the catalyst in beds 14, 16, and 18, and a large increase in operating flexibility.

In general, for the apparatus and method of this invention, it will be apparent to those skilled in the art that the relative design flow rates of the two nozzles 44 and 46 can vary with the specific application. In Example 3, for instance, the design flow rate of nozzle 44 is 37% of the sum of the design flow rates for nozzles 44 and 46, and the design flow rate of nozzle 46 is 63% of the sum of the design flow rates for nozzles 44 and 46. The design flow rates of each nozzle may be equal, i.e. 50% of the sum of the design flow rates for the two nozzles. In order to have a wider operating range of flow rates, it is preferred that the design flow rate of one nozzle be larger than the design flow rate of the other nozzle. The design flow rate of one nozzle is generally from about 5% to about 49%, preferably from about 20 to about 45%, and more preferably from about 30 to about 41%, of the sum of the design flow rates of the two nozzles. Accordingly, the design flow rate of the other nozzle is generally from about 51% to about 95%, preferably from about 55 to about 80%, and more preferably from about 59 to about 70%, of the sum of the design flow rates of the two nozzles.

It will also be apparent to those skilled in the art that, where the design flow rates of the two nozzles are different, then it will be suitable for the cross-sectional area in the assembly 20 for flow of quench material to the nozzle having the higher design flow rate to be greater than the cross-sectional area for flow of quench material to the nozzle having the lower design flow rate. Thus, the cross-sectional area of the annular space 35, which provides quench material to nozzle 46, is greater than the cross-sectional area within inner quench pipe 26. Furthermore, it is not a requirement of the present invention that the quench material flowing to the high design rate nozzle 46 must flow through the annular space 35 while the quench material flowing to the low design rate nozzle 44 must flow through the inner quench pipe 26. Accordingly, as an alternative to the embodiments shown in the Figures, for an outer quench pipe of a given inside diameter, a larger-diameter inner quench pipe 26 may be used, thereby increasing the cross-sectional area available for flow through the inner quench pipe 26 and decreasing the cross-sectional area available for flow through the annular space 35. Thus, it will be apparent to those of ordinary skill in the art that the inner quench pipe 26 could supply quench material to a nozzle having a higher design rate than that of the nozzle to which quench material is supplied via annular space 35.

The dimensions for the inventive contacting chamber and its elements, in particular its conduits and its nozzles, cannot be set forth herein with great specificity, since a great many factors will affect the dimensions which are required and any specific application. Among the factors to consider in a catalytic condensation reactor, for example, are the rate of flow of the effluent from the catalyst bed above to the bed below, and the rate of flow of the quench material. The vapor-liquid distribution of the effluent flowing from the bed above will also affect the dimensions which are required in the design of the conduits and nozzles, and the temperature and pressure of the effluent will have a pronounced effect upon this vapor-liquid distribution. In addition, it must be realized that the temperature at which the quench material is introduced via a vessel port 40 will also have a pronounced effect on the degree of quench which is experienced and on the spray affect which is produced. Finally, molecular weights must be considered, and the density and viscosity of the various liquid and vapor phases is of primary consideration. However, for purposes of illustration of the application of this invention in a cylindrical, vertically oriented chamber, it may be set forth typical relative positions of the nozzles and the center point of a horizontally-positioned substantially circular bottom face of a catalyst bed in such a chamber. If the substantially circular face has a center point and a radius R, then the distance between the center point and the vertical projection from the aperture(s) of any nozzle to the center point of the face is generally less than 10%, and preferably less than 5%, of the radius R.

It will also be apparent to those skilled in the art that this invention in is not limited to only a single pipe and nozzle assembly 20 below any particular bed. That is, multiple assemblies 20, each mounted to a vessel port 40, may extend into open space 17 between beds 12 and 14. For example, four assemblies may extend into open space 17, with each assembly's nozzle optimally positioned to cover one-fourth of the cross-section of the bed face, so that all four nozzles cover the entire cross-section of the bed face. Where more than one assembly extends into such an open space below a horizontally-positioned circular bottom face of a catalyst bed in a cylindrical, vertically oriented chamber, the distance between the center point of the face and the vertical projection from the aperture(s) of any nozzle to the center point of the face may be greater than 10% of the face radius R.

This invention is also not limited to only one inner quench pipe 26 within the outer quench pipe 42. Depending on the cross-sectional areas of annular spaces 25 and 35, one more additional inner quench pipes or inner quench tubing lengths may be accommodated, for a total of two or more inner quench pipes or inner quench tube lengths. Each additional inner quench pipe or tubing would have, at the end that is extended toward end plate 37, a corresponding opening in plate 37, and would be attached via its corresponding fitting to a individual nozzle. In this way, additional nozzles could be incorporated into a single assembly 20 and thus into space 17. The additional inner quench pipe or tubing could extend through outer quench pipe 42 and into outer quench pipe extension 36. From there, the other end of each additional inner quench pipe or tubing could be routed through an opening which could be provided in the wall of the outer quench pipe extension 36, and connected a quench supply line. Alternatively, the additional inner quench pipe or tubing could be routed within an existing inner quench pipe or tubing, so that not only is the existing inner quench pipe or tubing in an annular arrangement with respect to the outer quench pipe and outer quench pipe extension, but the additional inner quench pipe or tubing is in an annular arrangement with respect to the existing inner quench pipe or tubing.

Preferably, each such additional nozzle added would be smaller in design flow rate than any of the existing nozzles. Obviously, this is preferable from the viewpoint of being able to fit the additional nozzle and its fitting within the limited space on the end plate 36 and to fit the inner quench pipe within the confined annular spaces 25 and 35. In addition, this is preferable from the point of view of widening the range of quench flow rates provided by a given nozzle and piping assembly 20. For example, if the range of operation of the largest nozzle is from 70% to 100% of the design rate of flow of quench material between two beds, and the range of operation of the second-largest nozzle is from 49% to 70% of that design flow rate, then the purpose for adding any third nozzle would be to have a range of operation from 49% and below, in particular from 34.3% to 49% of that design flow rate. Thus, the third nozzle would be the smallest of the three nozzles. It will be apparent to those skilled in the art that this example presupposes that each of these three nozzles has a range of operation of from 70% to 100% of its design flow, since for the second largest nozzle 70% of 70% is 49%, and for the third nozzle 70% of 49% is 34.3%. When a nozzle has a range of operation of from 70% to 100% of its design flow, the flow rate at 100% of its design flow is 143% of the flow rate at 70% of its design flow, since 100 divided by 70 is 1.43. Those skilled in the art are able to compute the corresponding percentages for any nozzle that has a range of operation relative to its design flow rate that is other than from 70% to 100%.

It will also be noted that quench material entering assembly 20 via quench material supply line 30 may have a different composition from the quench material entering assembly 20 via quench material supply line 22. That is, in contrast to the embodiment shown in FIG. 2 wherein a common supply line 102 is capable of delivering quench material of a single composition to both lines 104 and 108, an alternative embodiment would be capable of supplying quench material of a different composition from a separate and independent source to line 108, while line 102 would continue to be capable of supplying quench material to line 104. In this embodiment, there would be no connection fluid communication between line 102 and line 108. Such an embodiment would be useful if it was desired to be able to pass a quench fluid having one composition to the chamber when the need for quench material is great and only the nozzle having the high design rate is in use, while also being capable of passing a quench material having a different composition to the chamber when the need for quench material is small and only the nozzle having the low design rate is in use.

The apparatus and method of this invention are useful in olefin oligomerization, aromatic alkylation, and other types of hydrocarbon conversion processes where solid catalysts have been known to be useful. In olefin oligomerization, the source of the olefin input stream is typically a light gas stream recovered from the gas separation section of a fluid catalytic cracking (FCC) process. Other sources for suitable olefin feeds will also include $C_4$ streams from steam cracking and coker off gas. The olefin feed stream is characterized by having an overall $C_4$ olefin concentration of at least 10 wt %. In most operations, this olefin feed stream will contain $C_4$ olefins but it may also constitute all or substantial quantities of $C_3$ olefins. Typically the olefin feeds can have a $C_3$ to $C_5$ olefin concentration of at least 30 wt %. Preferred feeds will have a $C_4$ olefin concentration of at least 30 wt % and more preferably at least 50 wt %. Preferably the olefin feed stream will comprise at least 20 wt % and more preferably 30 wt % isobutene. The isobutene will preferably comprise at least 33% of the total butenes. The olefin content of preferred feeds will predominately comprise branched olefins with isobutene present in large quantities. The reaction of normal pentenes and propylene is promoted by maintaining a high concentration of isobutene in the feed to the oligomerization zone of this invention. Oligomerization of pentene and propylene into high octane isomers is promoted by having an olefin distribution in the feed to the isomerization zone that comprises at least 50 wt % isobutene. When large quantities of propylene are present in the feed to the oligomerization zone, the octane number of the product may be increased by raising the percentage of isobutene in the butene fraction of the feed. Preferably the butene fraction will comprise 65% isobutene when large amounts of propylene enter the oligomerization zone.

Suitable oligomerization zones for this invention take on many forms. The oligomerization process is known by many names such as catalytic condensation and also catalytic polymerization. Known catalysts for effecting such reactions include heterogeneous catalysts such as Y zeolites, beta zeolites, silicalite, and sulfonated resins, as well as homogenous catalysts such as boron trifluoride, as described in U.S. Pat. Nos. 3,906,053; 3,916,019 and 3,981,941.

The preferred catalyst for the oligomerization process is a solid phosphoric acid (SPA) catalyst. The SPA catalyst refers to a solid catalyst that contains as a principal ingredient an acid of phosphorous such as ortho-, pyro-, or tetra-phosphoric acid. The catalyst is normally formed by mixing the acid of phosphorous with a siliceous solid carrier to form a wet paste. This paste may be calcined and then crushed to yield catalyst particles, and the paste may be extruded or pelleted prior to calcining to produce more uniform catalyst particles. The carrier is preferably a naturally occurring porous silica-containing material such as kieselguhr, kaolin, infusorial earth, and diatomaceous earth. A minor amount of various additives such as mineral talc, fuller's earth, and iron compounds including iron oxide may be added to the carrier to increase its strength and hardness. The combination of the carrier and the additives preferably comprises about 15–30% of the catalyst, with the remainder being the phosphoric acid. The additive may comprise about 3–20% of the total carrier material. Variations from this such as a lower phosphoric acid content are however possible. Further details as to the composition and production of SPA catalysts may be obtained from U.S. Pat. Nos. 3,050,472; 3,050,473; 3,132, 109; 4,912,279; 4,946,815; 5,043,509; 5,059,737; and 5,081,086; and from other references.

Oligomerization zones in general are maintained at conditions which may vary widely depending on the olefins undergoing reaction and the desired product. Operating conditions also depend on the specific catalyst composition that is employed. Operating conditions may be suitable for maintaining vapor phase, liquid phase, or mixed vapor-liquid phase operation. The oligomerization reaction zone may be also be operated at temperatures and pressures that increase compatibility with conditions of upstream processes that provide the oligomerization feedstocks or of downstream processes that use the oligomerization effluent. A broad range of suitable pressures is from about 15 psi(g) to about 1200 psi(g) (103 to 8274 kPa(g)). The introduction of $C_8$ and heavier paraffins into the oligomerization reaction zone has been found in some cases to improve selectivity of the oligomerization reaction zone to $C_8$ olefin production. In a preferred embodiment of the method of this invention, an SPA catalyst is utilized in a chamber-type reactor to form an effluent containing $C_5$ through $C_{12}$ hydrocarbons having boiling points within a gasoline boiling point range of about 100° F. to about 450° F. (38 to 232° C.) as determined by the appropriate ASTM distillation method. The preferred temperature of the oligomerization reaction zone will typically be in a range of from 200 to 500° F. (93 to 260° C.) and will more typically be in a range of from 300 to 450° F. (149 to 232° C.). Pressures within the oligomerization reaction zone will usually be in a range of from 200 to 1200 psi(g) (1378 to 8274 kPa(g)) and more typically in a range of from 400 to 1000 psi(g) (2758 to 6895 kPa(g)). Steam or water may be fed into the reactor to maintain the desired water content in the catalyst.

The catalyst is preferably disposed in fixed beds within the oligomerization zone in what is known as a chamber-type reactor structure. In a chamber-type reactor, the reactants flow through a series of large diameter catalyst beds. The temperature of the reactants may be controlled by passing relatively inert hydrocarbons which act as a heat sink, and isobutane in the oligomerization feedstock supplies a large proportion of the inert hydrocarbons that act as the heat sink. However, in accord with the apparatus and method of this invention, temperature control within the oligomerization reaction zone is also promoted by the use of a quench material. A quench material that comprises the inert materials and $C_8$ and heavier paraffins may be used simultaneously for temperature control. The quench material serves as its primary advantage of the control of temperatures within the oligomerization reaction zone. As a secondary purpose, the quench material can provide a flushing function to inhibit the development of coke and the deactivation of coke in the deactivation of the catalyst within the reaction zones. As pressure within the oligomerization reaction zone decreases the flushing function of the quench material decreases as the vaporization of the reactants and quench within the reaction zone increase. The use of higher molecular weight quench material within the oligomerization reaction zones to inhibit coking while permitting lower pressure operation is one possible method for the operation of this invention. Thus, the addition of heavier quench materials facilitates the operation of the oligomerization zone at higher temperatures and lower pressures while still flushing the catalyst and preventing coke production. The passing of higher molecular weight paraffins, such as $C_8$ and heavier hydrocarbons, can also improve selectivity of the oligomerization zone to produce the desired $C_7+$ olefin products. Since the higher molecular weight materials have benefits beyond use as a quench, it can be beneficial to add all or a portion of such material to the inlet of oligomerization reactor with the feed.

The different catalyst beds are preferably contained within one or more cylindrical, vertically oriented vessels and the feed stream preferably enters the top of the reactor. The olefins then are passed downwardly through the chamber and its beds. Typically, a chamber-type reactor will contain about five catalyst beds.

With the addition of the olefin input stream the combined feed to the oligomerization zone will preferably have a ratio of paraffins to olefins of from 1:1 to 5:1. Typically the paraffin concentration of the feed to the oligomerization reaction zone will be at least 50 wt % and more typically at least 70 wt %. A high percentage of the olefins in the feed stream entering the process as the secondary feed stream upstream are reacted in the oligomerization reaction zone along with the isobutene with olefin conversions in the range of from 80 to 99%. The principal oligomerization products comprise $C_7+$ olefins.

When used to effect alkylation of aromatic hydrocarbons with an alkylating agent, the alkylating agent may be selected from a group of diverse materials including monoolefins, diolefins, polyolefins, acetylenic hydrocarbons, and also alkylhalides, alcohols, ethers, esters, the latter including alkylsulfates, alkylphosphates, and various esters of carboxylic acids. The preferred olefin-acting compounds are olefinic hydrocarbons which comprise monoolefins containing one double bond per molecule. Monoolefins which may be used as olefin-acting compounds in the method of the present invention are either normally gaseous or normally liquid and include ethylene, propylene, 1-butene, 2-butene, isobutene, and the higher molecular weight normally liquid olefins such as the various pentenes, hexenes, heptenes, octenes, and mixtures thereof, and still higher molecular weight liquid olefins, the latter including various olefins polymers having from about 9 to about 18 carbon atoms per molecule including propylene trimer, propylene tetramer, propylene pentamer, etc. Cycloolefins such as cyclopentene, methylcyclopentene, cyclohexene, methylcyclohexene, etc., may also be utilized, although not necessarily with equivalent results. Other hydrocarbons such as paraffins, naphthenes, and the like containing 2 to 18 carbon atoms may also be present in the alkylating agent. For catalyzing aromatics production, it is preferred that the monoolefin contains at least 2 and not more than 14 carbon atoms. More specifically, it is preferred that the monoolefin is propylene.

The aromatics substrate which is charged to the alkylation reaction zone in admixture with the alkylating agent may be selected from a group of aromatics compounds which include individually and in admixture, benzene and monocyclic alkyl-substituted benzene of from 7 to 12 carbon atoms having the structure of a phenyl group to which is attached from 1 to 5 groups selected from a methyl group, an ethyl group, or a combination thereof. In other words, the aromatics substrate portion of the feedstock may be benzene, an alkylaromatic containing from 1 to 5 methyl and/or ethyl group substantial ends, and mixtures thereof. Non-limiting examples of such feedstock compounds include benzene, toluene, xylene, ethylbenzene, mesitylene (1,3,5-trimethylbenzene) and mixtures thereof. It is especially preferred that the aromatics substrate is benzene.

Known catalysts for effecting such reactions include heterogeneous catalysts such as Y zeolites, beta zeolites, ZSM-5, PSH-3, MCM-22, MCM-36, MCM-49, and MCM-56. Suitable catalysts also include the zeolite beta disclosed in U.S. Pat. No. 5,723,710, and solid phosphoric acid (SPA) catalyst described hereinabove.

Generally, the alkylation zone is maintained at conditions which may vary over a wide range based on the desired reactants, products, and catalyst. Temperatures which are typical for use in the method of this invention are those temperatures which initiate a reaction between an aromatic substrate and the particular olefin used to selectively produce the desired monoalkylaromatic compound. Temperatures suitable for use are generally from about 212 to about 734° F. (100 to 390° C.), especially from about 302 to about 527° F. (150 to 275° C.). Pressures suitable for use in the method of this invention are preferably above about 14.7 psi(g) (101 kPa(g)), but should not be in excess of about 1900 (13100 kPa(g)). An especially desirable pressure range is from about 147 to about 588 psi(g) (1014 to 4054 kPa(g)). The liquid hourly space velocity (LHSV) based upon the feed rate of the aromatic feedstock is generally from about 0.5 to about 50 hr$^{-1}$, and especially form about 1 to about 10 hr$^{-1}$. Although the operating conditions may be suitable for maintaining vapor phase, or mixed vapor-liquid phase operation, the temperature and pressure combination used is typically such that the alkylation reaction takes place in essentially the liquid phase. In a liquid phase process for producing alkylaromatics, the catalyst is continuously washed with reactants, thus preventing buildup of coke precursors on the catalyst. This results in reduced amounts of carbon forming on the catalyst. This, in turn, extends catalyst cycle life as compared to a gas phase alkylation process, in which coke formation and catalyst deactivation can be a major problem. A regulated amount of water or steam may be added to the alkylation reaction zone in order to maintain the desired water content of the catalyst.

The catalyst within the alkylation zone is preferably disposed in fixed beds in a chamber-type reactor structure, as described previously for olefin oligomerization, in which the reactants flow through a series of large diameter catalyst beds. In a continuous process for alkylating aromatic hydrocarbons with olefins, the previously described reactants are continuously fed into the chamber-type reactor containing the catalyst. The feed admixture may be introduced into the alkylation reaction zone containing the alkylation catalyst at a constant rate, or alternatively, at a variable rate. Normally, the aromatic substrate and olefinic alkylating agent are contacted at a molar ratio of from about 1:1 to about 20:1 and preferably from about 2:1 to about 8:1. The preferred molar feed ratios help to maximize the catalyst life cycle by minimizing the deactivation of the catalyst by coke and heavy material deposition upon the catalyst. The alkylation reaction system may contain one or more multi-bed chamber-type reactors in serious. Although the feed to the reaction zone can flow vertically downwards through the catalyst in a typical plug-flow reactor or horizontally across the catalyst in a radial-flow reactor, it is typical for the feed to flow vertically upward through the catalyst bed in a plug-flow reactor.

In order to maintain the reaction temperature in the preferred range and thus reduce the formation of unwanted polyalkylaromatics, if it is desirable to quench the reactants to dissipate the heat of reaction. In alkylation, a quench stream comprised of the alkylating agent olefin, the alkylating agent or a portion of the reactor effluent stream, or mixtures thereof, is injected into the alkylation reactor system in order to dissipate heat and supply additional amounts of olefin alkylating agent and unreacted aromatic substrate at various locations within the reaction zone. This is accomplished, for example, in a single-stage reactor by multiple injection of the aforementioned quench stream components into the reaction zone via strategically placed inlet lines leading into the reaction zone. The amount and composition of quench material injected into either a single stage reaction system or a multi-stage reaction system may be varied according to need. Benefits resulting from multiple quench injection include eliminating costly cooling apparatus, providing for a larger heat sink, optimizing the molar ratio of olefin-to-aromatic throughout the reaction zone, and improving selectivity to the desired alkylaromatic product.

The different catalyst beds are preferably contained within one or more cylindrical, vertically oriented vessels and the aromatic feed stream preferably enters the top of the reactor. The olefinic feed stream is typically divided into as many portions as there are catalyst beds, with one portion being injected above each bed. Each olefin portion is thus mixed either with the reactor feed or with a bed effluent, and the resulting mixture passes downwardly to the bed below the point of mixing. Typically, a chamber-type reactor will contain about two to four catalyst beds.

A substantial portion of the aromatic substrate hydrocarbon and essentially all of the olefin alkylating agent react in the alkylation reaction zone in the presence of the catalyst to form monoalkylaromatic compounds and polyalkylaromatic compounds. The preferred products of the alkylation process using the apparatus and method of this invention include cumene (isopropylbenzene) and ethylbenzene.

While the embodiments disclosed here in above have been directed to the exothermic catalytic reactions of olefins oligomerization and aromatics alkylation, the apparatus and method of the invention is not so limited. Those skilled in the art will perceive that the method of contacting two fluids in a fluid-solids contacting chamber and the apparatus therefor have equal application in any fluid-solids contacting zone, such as for the exothermic catalytic reaction of hydrocarbons in a hydrogen atmosphere and as in adsorption zones. Additionally, the apparatus is not limited to the injection between fixed beds of particulate contact solids, but it can also find application as the feed distribution apparatus at the top of the first bed contained within the contacting chamber. The method and apparatus also is not limited to the specific fluids discussed hereinabove. Thus, the first fluid passed downwardly through the bed above may be solely a liquid phase, solely a vapor phase, or a mixture of liquid phase and gas phase. Furthermore, the second fluid or third fluid flowing upward from the pipe and nozzle assembly need not be a low temperature fluid quenching a higher temperature down-flowing first fluid, but either may be at the same temperature as the first fluid, or may be at a temperature above the first fluid temperature in order to provide a heat input into the fluid-solids contacting zone.

What is claimed is:

1. A method of mixing fluids in a fluid-solid contacting chamber, the method comprising:

a) withdrawing an effluent from a first bed containing particulate solids in a fluid-solid contacting chamber, and passing said effluent into an interbed space within said chamber, wherein said interbed space is defined in part by said first bed and the wall of said contacting chamber;

b) passing a first quench fluid into an inlet end of a first quench conduit, and discharging the first quench fluid from an outlet end of said first quench conduit into said interbed space at a first flow rate;

c) after said passing at said first flow rate in b), decreasing the flow rate of said first quench fluid to a second flow rate that is less than said first flow rate;

d) after said passing at said first flow rate in b), passing a second quench fluid into an inlet end of a second quench conduit, and discharging said second quench fluid from an outlet end of said second quench conduit at a third flow rate, wherein the wall of said first quench conduit and the wall of said second quench conduit define an interconduit space, wherein said second quench fluid passes through said interconduit space, and wherein said third flow rate is less than said first flow rate;

e) after said passing at said third flow rate in d), decreasing the flow rate of said second quench fluid to a fourth flow rate that is less than said third flow rate;

f) contacting said effluent with at least one of said first quench fluid and said second quench fluid in said interbed space to produce a mixture; and g) passing said mixture to a second bed containing particulate solids in said fluid-solid contacting chamber.

2. The method of claim 1 wherein said second flow rate is less than 70% of said first flow rate.

3. The method of claim 1 wherein said second flow rate is 0% of said first flow rate.

4. The method of claim 1 wherein said fourth flow rate is less than 70% of said third flow rate.

5. The method of claim 1 wherein said fourth flow rate is 0% of said third flow rate.

6. The method of claim 1 wherein said third flow rate is not more than said second flow rate.

7. The method of claim 1 further characterized in that while the flow rate of said first quench fluid is decreased in c) said second quench fluid is passed in d).

8. A method of mixing fluids in a fluid-solid contacting chamber, the method comprising:
   a) withdrawing an effluent from a first bed containing particulate solids in a fluid-solid contacting chamber, and passing said effluent into an interbed space within said chamber, wherein said interbed space is defined in part by said first bed and the wall of said contacting chamber;
   b) passing a first quench fluid into an inlet end of a first quench conduit, and discharging said first quench fluid from an outlet end of said first quench conduit into said interbed space at a first flow rate;
   c) after said passing at said first flow rate in b), increasing the flow rate of said first quench fluid to a second flow rate that is more than said first flow rate;
   d) after said increasing the flow rate to said second flow rate in c), decreasing the flow rate of said first quench fluid to a third flow rate that is less than said first flow rate;
   e) after said increasing the flow rate to said second flow rate in c), passing a second quench fluid into an inlet end of a second quench conduit, and discharging said second quench fluid from an outlet end of said second quench conduit at a fourth flow rate, wherein the wall of said first quench conduit and the wall of said second quench conduit define an interconduit space, wherein said second quench fluid passes through said interconduit space, and wherein said fourth flow rate is more than said first flow rate;
   f) after said passing at said fourth flow rate in e), increasing the flow rate of said second quench fluid to a fifth flow rate that is more than said fourth flow rate;
   g) after said passing at said fifth flow rate in f), decreasing the flow rate of said second quench fluid to a sixth flow rate that is less than said fourth flow rate;
   h) contacting said effluent with at least one of said first quench fluid and said second quench fluid in said interbed space to produce a mixture; and
   i) passing said mixture to a second bed containing particulate solids in said fluid-solid contacting chamber.

9. The method of claim 8 wherein said second flow rate is more than 143% of said first flow rate.

10. The method of claim 8 wherein said third flow rate is 0% of said first flow rate.

11. The method of claim 8 wherein said fifth flow rate is more than 143% of said fourth flow rate.

12. The method of claim 8 wherein said sixth flow rate is 0% of said fourth flow rate.

13. The method of claim 8 wherein said fourth flow rate is not less than said second flow rate.

14. The method of claim 8 further characterized in that while the flow rate of said first quench fluid is decreased in d) said second quench fluid is passed in e).

* * * * *